Patented Dec. 12, 1922.

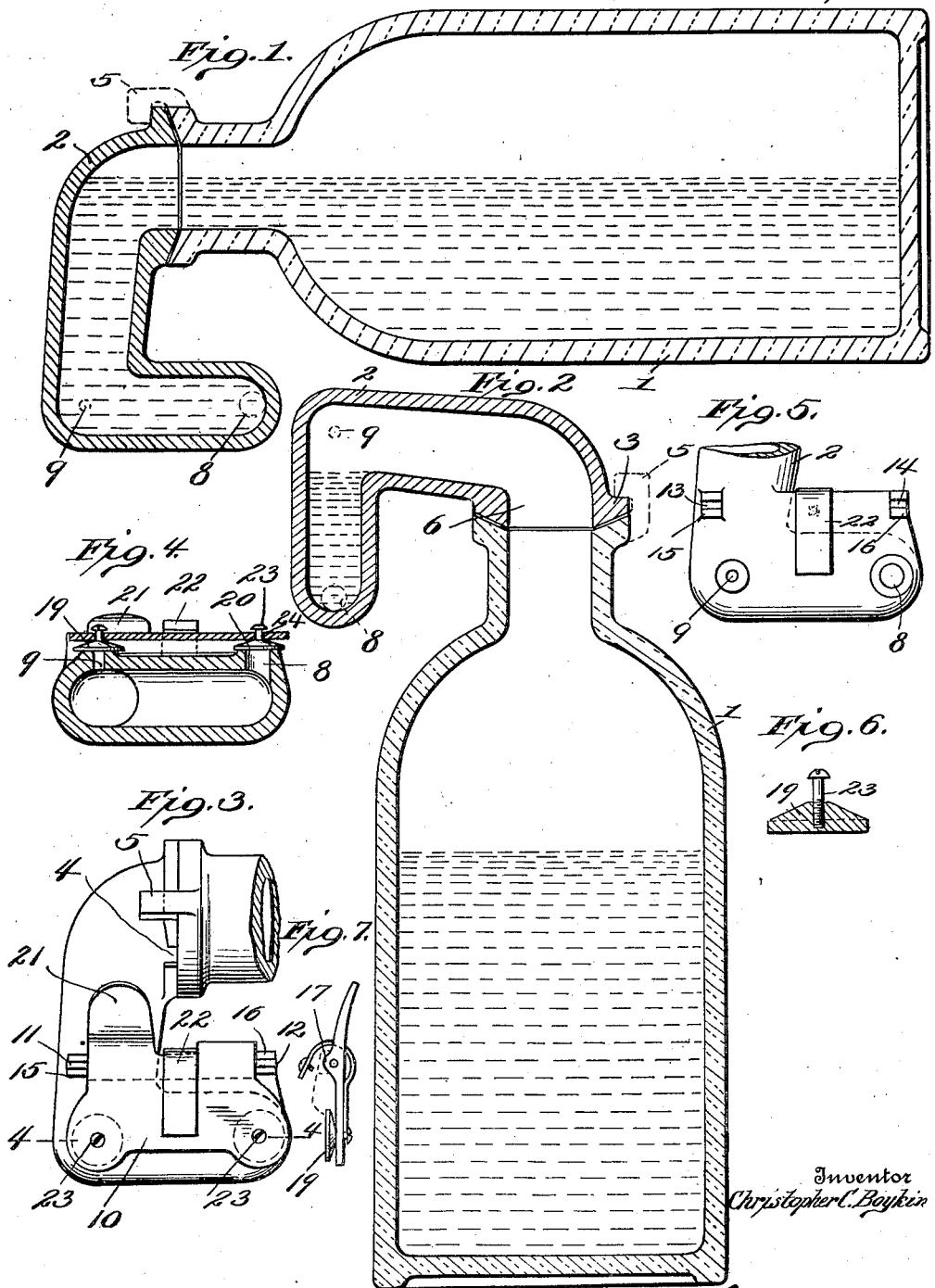

1,438,892

UNITED STATES PATENT OFFICE.

CHRISTOPHER C. BOYKIN, OF NORFOLK, VIRGINIA.

MEASURING CAP FOR LIQUID-DISPENSING DEVICES.

Application filed December 9, 1921. Serial No. 521,215.

*To all whom it may concern:*

Be it known that I, CHRISTOPHER C. BOYKIN, a citizen of the United States, residing at Norfolk, in the county of Norfolk and State of Virginia, have invented new and useful Improvements in Measuring Caps for Liquid-Dispensing Devices, of which the following is a specification.

This invention relates to measuring caps for bottles and has for one of its objects the provision of a cap of the class indicated in which a definite quantity of liquid is supplied to and retained in the measuring cap by the act of tilting the bottle to which it is applied and then restoring it to an upright position.

Another object of the invention is to provide a measuring cap having an off-set downwardly extending portion adapted to segregate a measured quantity of liquid from the body of liquid within the bottle by the act of tipping the bottle and then restoring it to an upright position, said off-set portion being provided with a liquid discharge aperture and an air relief aperture and having means for simultaneously opening and closing said apertures.

A further object of the invention is the construction of a measuring cap wherein the air relief aperture and the liquid discharge aperture open to one side of the measuring cap in a single plane and are controlled by a manually operable valve plate externally mounted on said measuring cap and carrying a valve for closing each of said apertures, and wherein the valves have their seating faces normally in the same plane and their back faces curved so as to accommodate themselves to inequalities or misalignment in the seating surfaces surrounding said apertures.

Still another object of the invention is the construction of the valve plate in such a manner as to be readily demountable for cleansing purposes and replaceable without resort to any tools or the removal of any part except the valve plate itself and the valves supported thereby.

With the above and other objects in view, my invention consists in the improved measuring cap illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:

Figure 1 is a view in cross section showing the measuring cap attached to a bottle and tipped to filling position.

Figure 2 is a similar view showing the bottle restored to the upright position with the segregated portion of the liquid within the measuring cap.

Figure 3 is a side elevation of the measuring cap attached to the neck of the bottle, the rest of the bottle being broken away.

Figure 4 is a cross sectional view taken along the lines 4—4 of Figure 3.

Figure 5 is a side elevation of a portion of the measuring cap shown in Figure 3 with the valve plate removed.

Figure 6 is a view in cross section of one of the valves.

Figure 7 is a plan view of the valve plate showing also the attaching spring therefor.

In the drawings the numeral 1 represents a bottle having attached thereto and in communication therewith the measuring cap 2 which constitutes the subject of this invention. The measuring cap is secured to the mouth of the bottle in any suitable manner, one embodiment for so doing, herein shown, comprising a flange 3 at one end of the measuring cap having a notch 4 permitting the passage therethrough of the end of a lug 5 which overhangs the flange 3 when the measuring cap is rotated a slight distance beyond the point where said lug and notch are in registry.

The measuring cap comprises a chambered body, one end of which communicates with the mouth of the bottle, as shown at 6, the other end extending downwardly forming a reservoir or trap which is made of any desired capacity to hold a predetermined quantity of liquid. The intermediate portion of the body 2 extends transversely relative to the longitudinal axis of the bottle when the latter is in upright position. The reservoir is filled by being put into communication with the main body of liquid in the bottle by tilting the latter as shown in Figure 1. When the bottle is returned to an upright position a quantity of liquid will remain in said reservoir, the amount of which is determined by the depth of said reservoir below the level of the lower wall of the transverse portion of the body 2.

Adjacent the lower end of said reservoir a lateral aperture 8 is formed through one side thereof and a smaller aperture 9 is formed on the same side above the liquid level within said reservoir. The upper aperture is for the purpose of supplying the air necessary to replace the volume of liquid discharged from the lower aperture.

The exterior of the measuring cap at that side wherein the apertures 8 and 9 are formed is machined or otherwise finished so that the surfaces surrounding said apertures lie in one plane, and valve closure means are provided seating against said plane surfaces for opening and closing said apertures.

The valve closure means comprise a plate 10 carrying trunnions 11 and 12 which seat in slots 13 and 14 in the faces of lugs 15 and 16 which extend laterally from the side of the measuring cap. That side of the valve plate 11 which lies next to the measuring cap is made curved as shown at 17 in Figure 7 in order to permit it to rock along the pivotal axis through the trunnions. Mounted in said valve plate on one side of its axis and in registry with the apertures in the measuring cap are valves 19 and 20 and on the other side of said pivotal axis is a thumb piece 21 by which the valve plate is rocked and the valves thereby opened and closed. The valve plate 11 is held in position and the valves are normally maintained in closed position by means of a bent leaf spring 22 which embraces or straddles the measuring cap and said plate and bears upon that end of the latter which is adjacent the valves.

In order that the valves 19 and 20 may accommodate themselves to any misalignment or other inequality in the seating surfaces surrounding the apertures they are provided with curved or conical rear surfaces abutting the plate 11 and are mounted in said valve plate by means of pins 23 rigidly secured to said valves but loosely supported in apertures 24 in said valve plate. These pins are preferably screw-threaded as shown in Figure 6 so that the amount of play of said valves may be adjusted.

The normal operation of the device is clearly indicated in the drawings and foregoing description. It is particularly adapted for use in the dispensing of mixed beverages in which a small measured quantity of liquid ingredient is used in the preparation of each drink. By my improved device the desired quantity of liquid ingredient or flavoring may be quickly and accurately measured and as quickly discharged.

On account of the fact that the flavors or ingredients in common use are sticky in their nature, internally valved devices of this kind are apt to become clogged and inefficient in their operation. By the construction of the present device, the trunnions of the valve plate may be readily slipped from the notches of the cap by manual pressure against the plate, in opposition to the spring 22, and the valve plate thus be removed for cleansing. The location of the valves 19 and 20 externally of the device also makes it easy to keep them in clean and efficient order and the fact that the valve plate and valves my be readily removed without the aid of a tool facilitates the maintenance of the parts in sanitary condition.

Obviously, changes in the details of construction may be made without departing from the spirit of the invention and I do not wish to limit myself to any particular form or arrangement of parts.

Having described my invention what I claim as new and desire to secure by Letters Patent, is:—

1. A measuring cap for liquid dispensing devices, comprising a chambered body having one end open and adapted to be secured to the mouth of a liquid container, and its other end bent angularly downward and adapted to retain a portion of liquid segregated from the body of liquid in the bottle, said downwardly extending portion being provided with an aperture adjacent its lower end, and a valve arranged externally of said body for controlling said aperture.

2. A measuring cap for liquid dispensing devices, comprising a chambered body having one end thereof open and adapted to engage the mouth of a liquid container, said body having a main portion thereof extending transversely of said liquid container when the latter is in upright position and its other end portion extending downwardly to form a chamber adapted to retain a portion of liquid segregated from the body of liquid in said liquid container, said downwardly extending portion having a discharge aperture opening laterally adjacent its lower end and an air relief aperture above the liquid level therein, a valve plate externally mounted on said body and valves carried by said valve plate for controlling said apertures.

3. A measuring cap for liquid dispensing devices, comprising a chambered body having one end thereof open and adapted to engage the mouth of a liquid container, said body having a main portion thereof extending transversely of said liquid container when the latter is in upright position and the other end portion thereof extending downwardly to form a chamber adapted to retain a portion of liquid segregated from the body of liquid in said liquid container, and having a discharge aperture opening laterally adjacent its lower end and an air relief aperture above the liquid level therein, a valve plate externally mounted on said body, and valves carried by said valve plate for controlling said apertures, each of said valves being loosely mounted upon said valve plate.

4. A measuring cap for liquid dispensing devices, comprising a chambered body having one end thereof open and adapted to engage the mouth of a liquid container, said body having a main portion thereof extending transversely of said liquid container when the latter is in upright position and the other end portion thereof extending downwardly to form a chamber adapted to retain a portion of liquid segregated from the body of liquid in said liquid container, and having a lateral discharge aperture adjacent its lower end and an air relief aperture above the liquid level therein, a valve plate externally mounted on said body having apertures opposite said openings, valves carried by said valve plate for controlling said apertures, said valves having their rear surfaces curved, and stems secured to said valves and loosely mounted in the apertures in said valve plates.

5. A measuring cap for liquid dispensing devices comprising a chambered body having one end thereof open and adapted to engage the mouth of a liquid container, said body having a portion arranged transversely with relation to the axis of said liquid container when in an upright position and having its other end portion extending downwardly forming a reservoir in which a measured quantity of liquid segregated from the body of liquid in said container may be entrapped, said downwardly extending portion having a lateral aperture adjacent its lower end and a second aperture in the same plane as the first aperture and located above the liquid level in said reservoir, spaced lugs projecting from said measuring cap on the same side as said apertures, each lug being provided with an open slot, a valve plate having trunnions pivotally supported in said slots, valves carried by said valve plate, one for each aperture, and a spring carried by said body and embracing said valve plate for urging said valves to a closed position and retaining said trunnions in said slots.

6. A measuring cap for liquid dispensing devices, comprising a chambered nozzle adapted to be secured to the neck of a liquid container and having an outlet opening, a valve plate removably secured to the exterior of said nozzle for controlling said outlet opening, and a spring cooperating with said nozzle and valve plate for normally holding said valve in closed position and maintaining said valve and nozzle in assembled relation.

In testimony whereof I have hereunto set my hand in presence of two subscribing witnesses.

CHRISTOPHER C. BOYKIN.

Witnesses:
H. G. PARKE,
J. R. HENLEY.